March 12, 1929.    J. H. GERSON    1,704,890
TRANSMISSION
Filed July 12, 1927    2 Sheets-Sheet 1

Inventor
John H. Gerson,

By Clarence A. O'Brien
Attorney

Inventor
John H. Gerson

By Clarence A. O'Brien
Attorney

Patented Mar. 12, 1929.

1,704,890

UNITED STATES PATENT OFFICE.

JOHN H. GERSON, OF NEW SMYRNA, FLORIDA.

TRANSMISSION.

Application filed July 12, 1927. Serial No. 205,079.

This invention relates to new and useful improvements in speed transmission devices and aims to provide a highly novel, simple and efficiently operating mechanism of this character, primarily though not specifically adapted for installation in the Ford type of automobile, as a substitution for the usual planetary transmission with which these types of machines are now equipped. By reason of the present invention, such designs of automobiles may be operated as tractors after the same have been otherwise changed, that is by the application of suitable tractor wheels, etc.

In carrying out my invention, there is provided a two speed transmission, wherein a direct drive may be presented between the drive and driven shafts, or wherein, when a certain unit of the device is in one position, a relatively high speed of the driven shaft will be had, whereas, when said member is reversed a relatively low speed will be had. In the first instance, the tractor is to be used under light loads, whereas in the second instance the tractor is to be used under heavy loads.

One of the most important objects of this invention is to provide a transmission of this character, wherein the counter shaft is readily reversible, so that the proper ratio between the drive and driven shafts may be had, when the tractor is to be used under varying conditions.

In the drawings, wherein for the purpose of illustration is shown the preferred embodiment of my invention:

Figure 1:
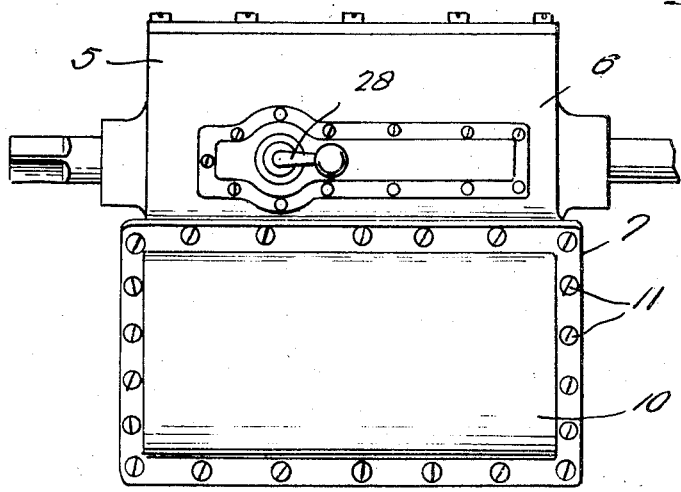
Figure 1 is a top plan view disclosing the transmission housing.
Figures 2, 5:
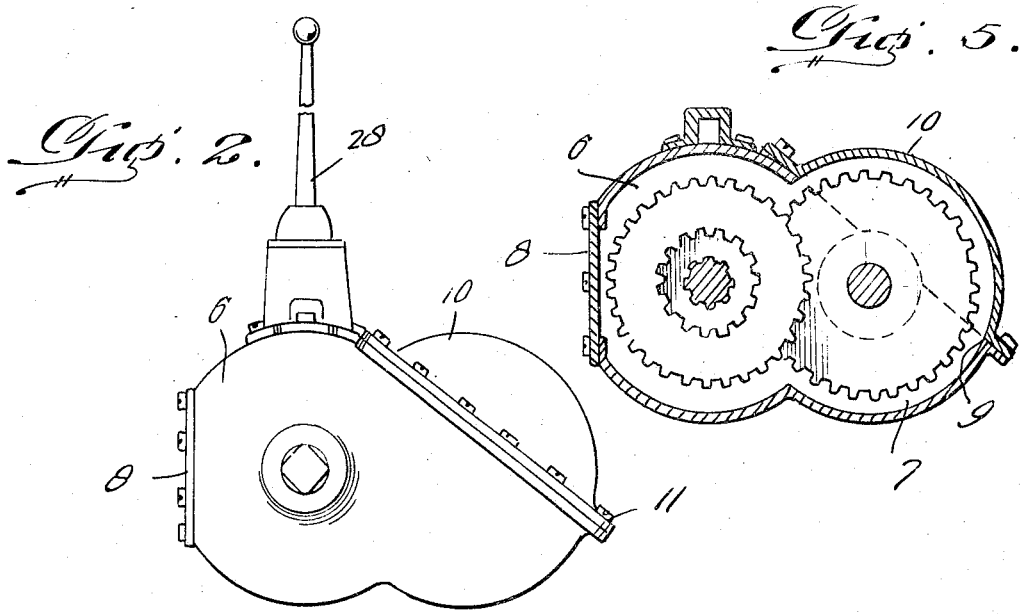
Figure 2 is a front end elevation thereof.
Figure 5 is a detail transverse section taken substantially upon the line 5—5 of Figure 3 and looking in the direction of the arrows.

Now having particular reference to Figures 1 to 5 inclusive, 5 designates a transmission housing, formed to provide somewhat circular and communicating chambers 6 and 7, the chamber 6 being formed at its outer side with an opening, over which is normally arranged a cover plate 8, the chamber 7 being formed with a diagonally extending opening 9, over which is arranged a curved lid 10, the edges of the opening and the lid being flanged so that the lid may be secured to the chamber by bolt and nut connections 11, as more clearly indicated in Figures 1 and 2.

The end walls of the chamber 6 of the housing 5 are formed with circular sockets 12—12, within which are arranged suitable thrust bearings 13—13. Said end walls of this chamber 6 of the housing have projecting therethrough and through the bearings 12—12 a drive shaft 14 and a driven shaft 15. The drive shaft 14 terminates at a point within the opposite end wall of the housing and at its end is formed with a rounded pin 16. Between this pin and the front end wall of the housing, said shaft 14 is longitudinally ribbed, as at 17. Longitudinally slidable upon this ribbed portion of the shaft 14 is a gear unit 18. This unit consists of a small spur gear 19, a large spur gear 20, and a bevelled gear 21. The bevelled gear 21 is at the end of the unit adjacent the driven shaft 15 and being spaced from the large spur gear 20, by a channeled yoke collar 22.

Figure 3:
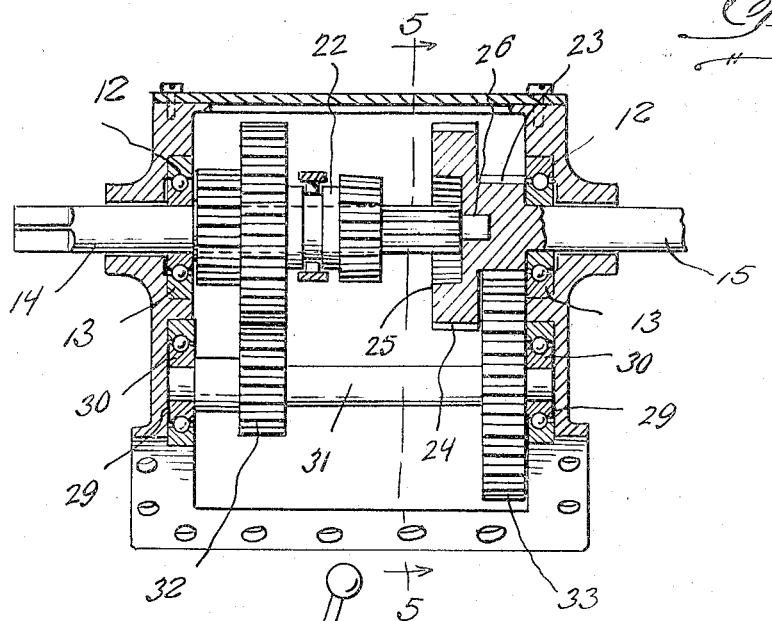
Figure 3 is a detail longitudinal section through the housing, disclosing the transmission mechanism per se, partly in plan and partly in section.
Figure 4:
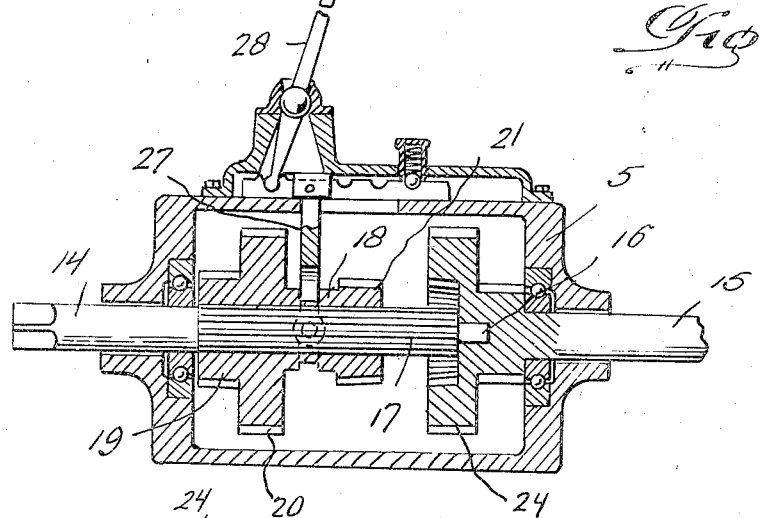
Figure 4 is a detail longitudinal section taken through the mechanism, at a point inwardly of the counter shaft.

The end of the driven shaft 15 within the housing is formed with a small spur gear 23, and a large spur gear 24, the gear 24 being inwardly of the gear 23, as clearly disclosed in Figure 3, and formed at its outer face and centrally thereof with a bevelled and toothed circular package 25, for receiving the bevelled gear 21 of the said drive shaft unit 18, when this unit is moved rearwardly in a longitudinal direction upon the drive shaft. Furthermore, within the center of the socket 25 of the gear 24 there is formed a circular socket 26, for receiving the rounded pin 16 upon the extreme inner end of the drive shaft 14, for supporting the inner end of said drive shaft.

Associated with the channeled collar 22 is a generally conventional yoke 27, operable by the usual gear shift lever 27, that extends upwardly from the top wall of the chamber 6 of the housing 5.

The end walls of the chamber 7 of the housing 5 are formed with circular sockets 29—29, for receiving suitable thrust bearings 30—30 within which are arranged the opposite ends of a counter shaft 31. The bearing sockets 29—29 at the opposite end walls of the chamber 7 are formed partially within the main chamber and partially within the lid 10 thereof, so that when the lid 10 is removed, the bearings may be readily removed and consequently the shaft 31, so that the said shaft may be readily reversed within its chamber.

Adjacent one end, this counter shaft 31 carries a small spur gear 32, while adjacent the opposite end thereof, the same carries a larger spur gear 33. When the counter shaft 31 is in the position indicated in Figure 3, the small gear 32 will have mesh with the gear 20 of the unit 18, slidable upon the driven portion 17 of the drive shaft 14, while the gear 33 at the opposite end of the counter shaft will have mesh with the small gear 23 upon the inner end of the driven shaft 15. When the unit 18 is in the position indicated in Figure 3, the drive will be through the shaft 14, gear 20, and thence to the small gear 32 of the counter shaft 31 and from its gear 33 to the small gear 23 of the driven shaft 15. By reason of this connection between the drive and driven shaft, a relatively high speed will be imparted to said driven shaft. However, by moving the unit 18 longitudinally upon the shaft 14, so that the bevelled gear 21 upon the inner end of the unit 18 will engage within the socket 25 of the gear 24 of the driven shaft 15, a direct drive will be presented between the drive and driven shafts.

Figure 7:
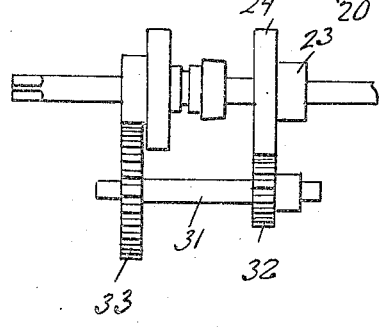
Figure 7 is a somewhat diagrammatic top plan disclosing the counter shaft as in reversed position from that indicated in Figure 3.

By simply reversing the position of the countershaft from that indicated in Figure 3 to that disclosed in Figure 7, the large gear 33 of the counter shaft 31 will have mesh with the small gear 19 of the sliding unit 18, whereas the small gear 32 of the counter shaft will have mesh with the large gear 24 of the driven shaft 15, so that when the gears are in mesh as is indicated in Figure 7, a slow speed will be imparted to the driven shaft, whereas when the unit 18 is slid longitudinally, the gear 19 will be forced out of engagement with the gear 33 and the bevelled gear 21 again affording the drive connection to the driven shaft 15 so that a direct drive will be presented to said driven shaft.

Figure 6:
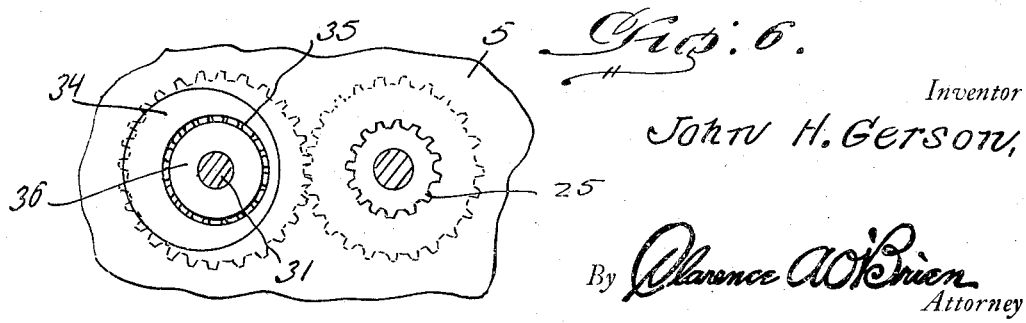
Figure 6 is a detail fragmentary section, disclosing an eccentric mounting, that may be provided for the ends of the counter shaft, so that the counter shafts equipped with various sizes of gears may be employed to present increased or decreased speed between the drive and driven shafts.

As indicated in Figure 6, the sockets of the ends of the chamber 7 of the housing may be equipped with discs similar to that indicated by the reference character 34, this disc being formed with an eccentric opening 35, within which is arranged a suitable bearing 36. When this type of mount is employed for the ends of the counter shaft 31, said counter shaft may be readily adjusted inwardly or outwardly with respect to the drive and driven shafts, so that a counter shaft with various sizes of gears may be installed, to increase or decrease the speed ratio above or below the ratios previously described.

Having thus described my invention, what I claim as new is:

1. In a transmission of the character designated, a housing and a drive and a driven shaft journaled through the end walls of the housing, a small and a large gear upon the end of the driven shaft within the housing, the inner end of the drive shaft terminating adjacent the large gear of the driven shaft, a unit longitudinally splined upon the ends of the drive shaft within the housing and including a small gear and a large gear provided with means for facilitating its movement upon the shaft, a counter shaft journaled within the housing and spaced in parallel relation with the drive and driven shafts, a small gear upon one end of the counter shaft, and a large gear upon its opposite end, said gears provided for mesh with the large and small gears of the drive and driven shafts, depending upon the position of the counter shaft within the housing, and means between the sliding unit and the driven shaft, whereby a direct driving connection may be established between the drive and driven shafts when the unit is moved rearwardly upon the drive shaft and out of mesh with the forward counter shaft gear.

2. In a transmission of the character described, a housing, a drive and driven shaft journaled to the end walls of the housing, a small and large gear upon the end of the driven shaft within the housing, the inner end of the drive shaft terminating adjacent the large gear of the driven shaft, a unit longitudinally splined upon the ends of the drive shaft within the housing and including a small gear and a large gear provided with means for facilitating its movement upon the shaft, a counter shaft journaled within the housing and spaced in parallel relation with the drive and driven shafts, a small gear upon one end of the counter shaft, and a large gear upon its opposite end, said gears provided for mesh with the large and small gears of the drive and driven shafts, depending upon the position of the counter shaft within the housing, and means between the sliding unit and the driven shaft, whereby a direct driving connection may be established between the drive and driven shafts when the unit is moved rearwardly upon the drive shaft and out of mesh with the forward counter shaft gear, and means complementary to the housing, whereby the counter shaft may be supported in reversed positions therein.

3. In a transmission of the character described, a housing, said housing being open at one side, a drive shaft journaled through one end of said housing, a driven shaft journaled through the opposite ends of the housing, a counter shaft having its ends journaled in the respective end walls of the housing and adjacent the open side thereof, said shaft being removable from said housing, a large gear and a small gear on the drive shaft, a large gear and a small gear on the driven shaft, a large gear and a small gear on the counter shaft, and in spaced relation to each other, the counter shaft being reversible within the housing and with respect to the drive and driven shaft gears for changing the driving speed and a cover for said open side of the housing.

In testimony whereof I affix my signature.

JOHN H. GERSON.